April 7, 1959     J. V. FREDD     2,880,804
APPARATUS AND METHOD FOR CUTTING WELL TUBING
Filed May 7, 1954     7 Sheets-Sheet 3
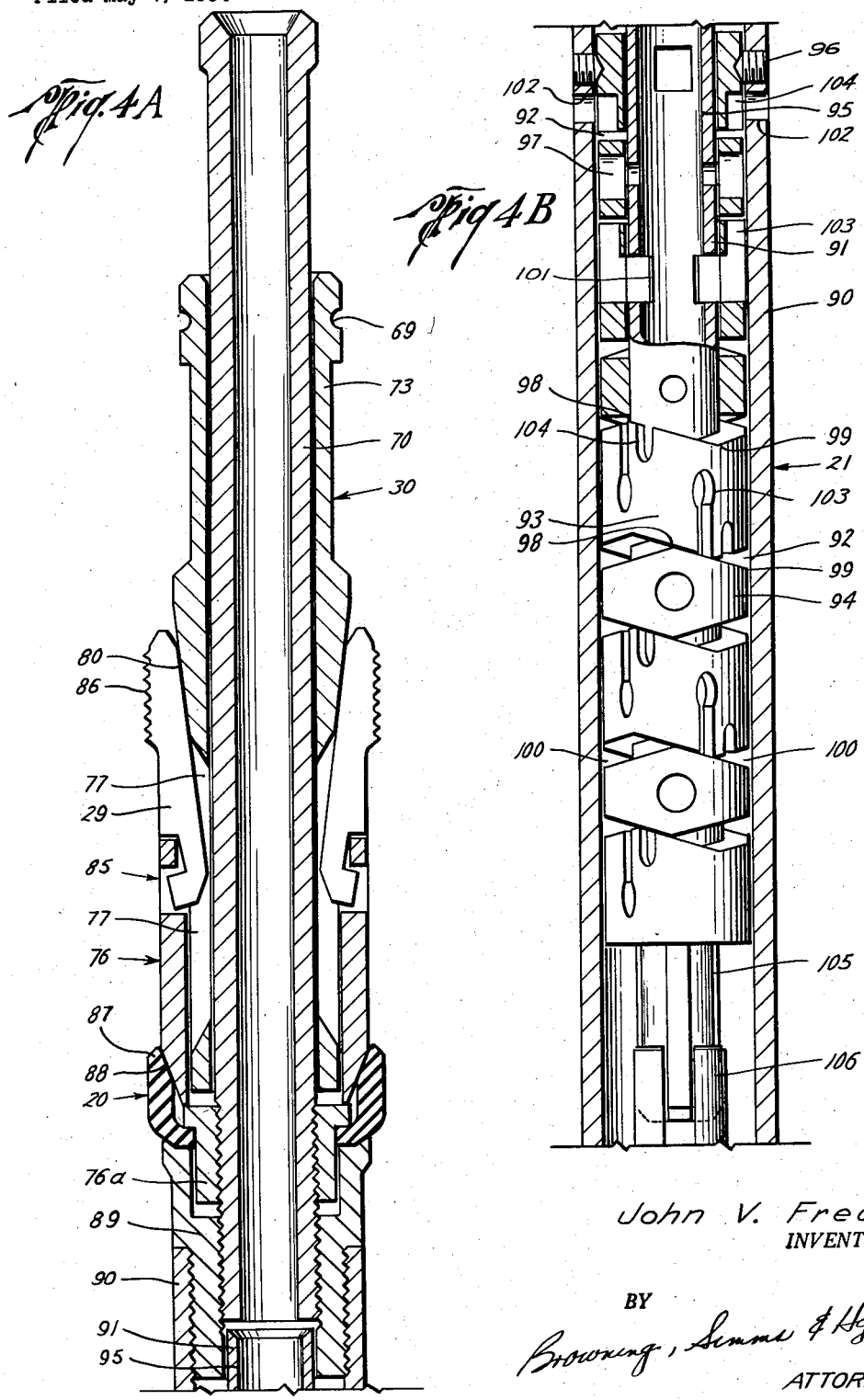
John V. Fredd
INVENTOR.
BY
Browning, Simms & Hyer
ATTORNEYS

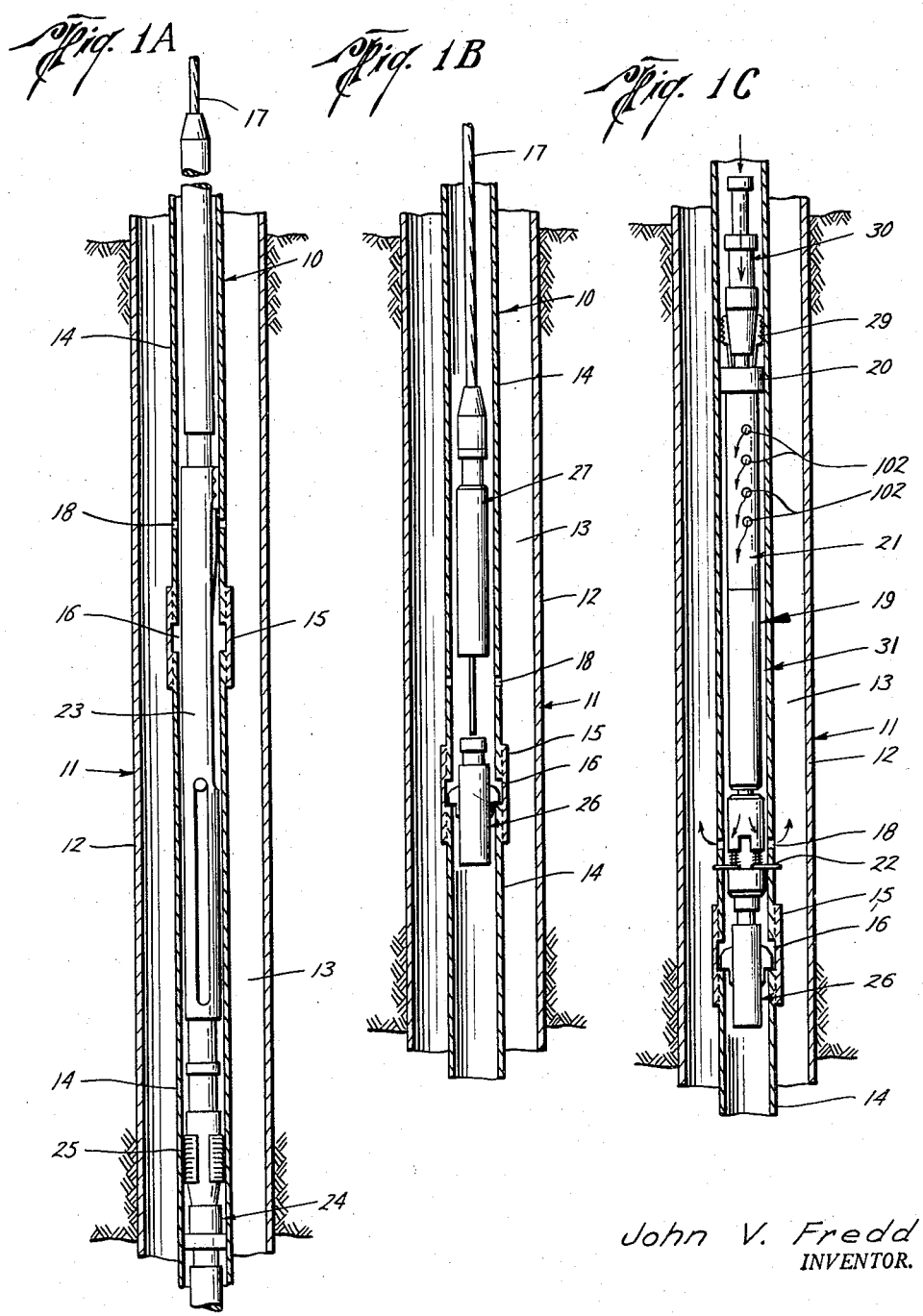

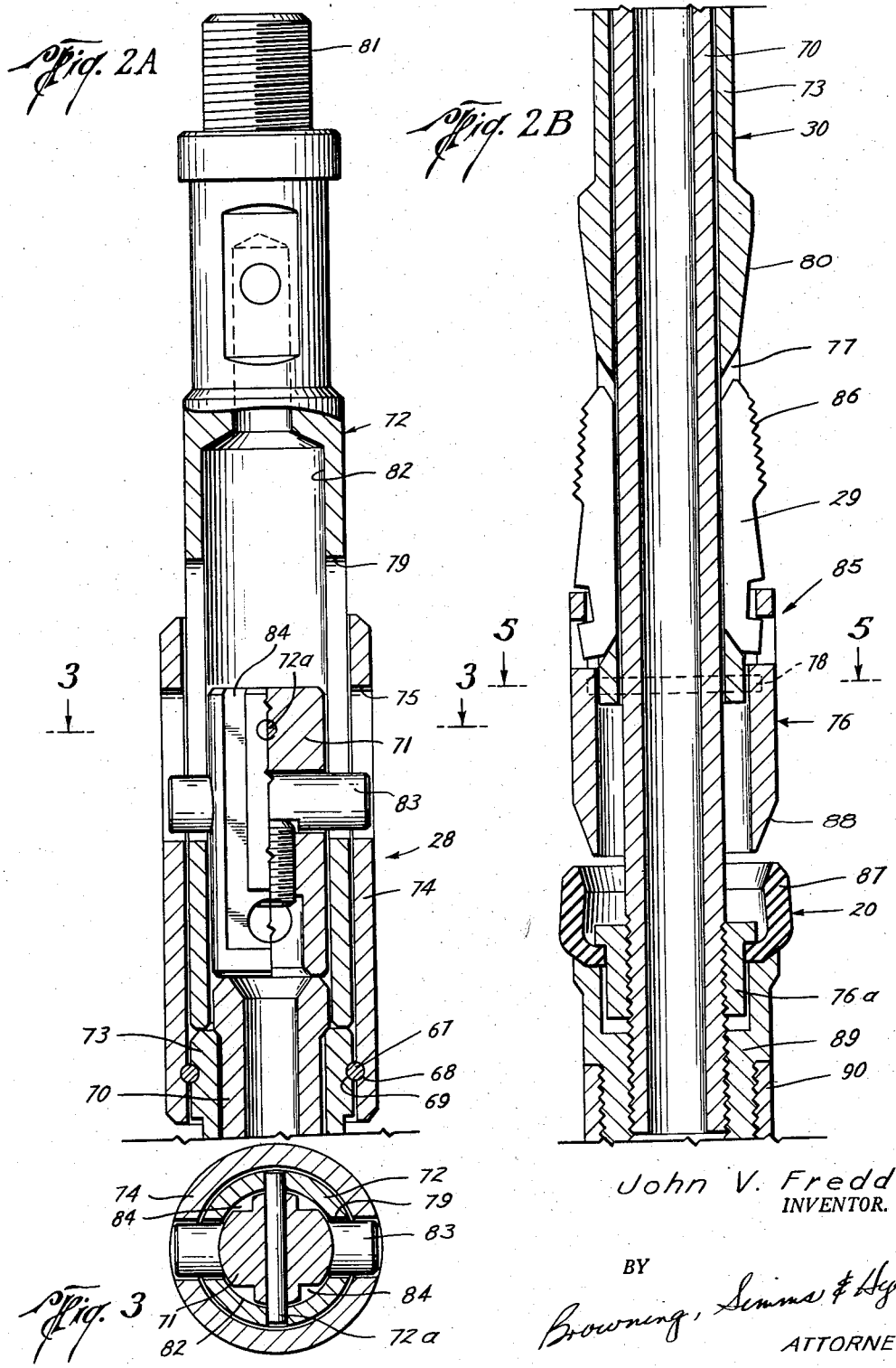

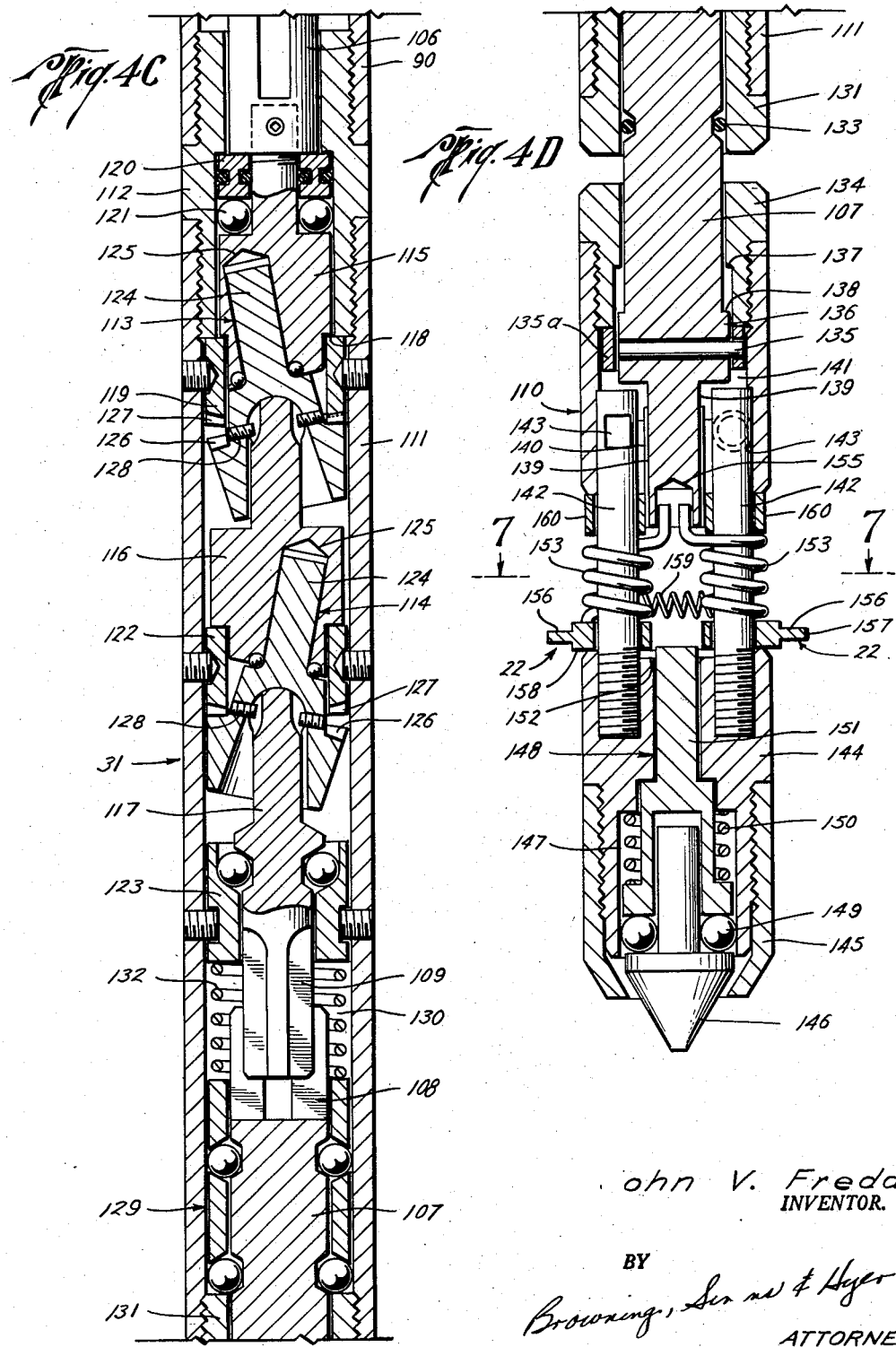

April 7, 1959    J. V. FREDD    2,880,804
APPARATUS AND METHOD FOR CUTTING WELL TUBING
Filed May 7, 1954    7 Sheets-Sheet 5
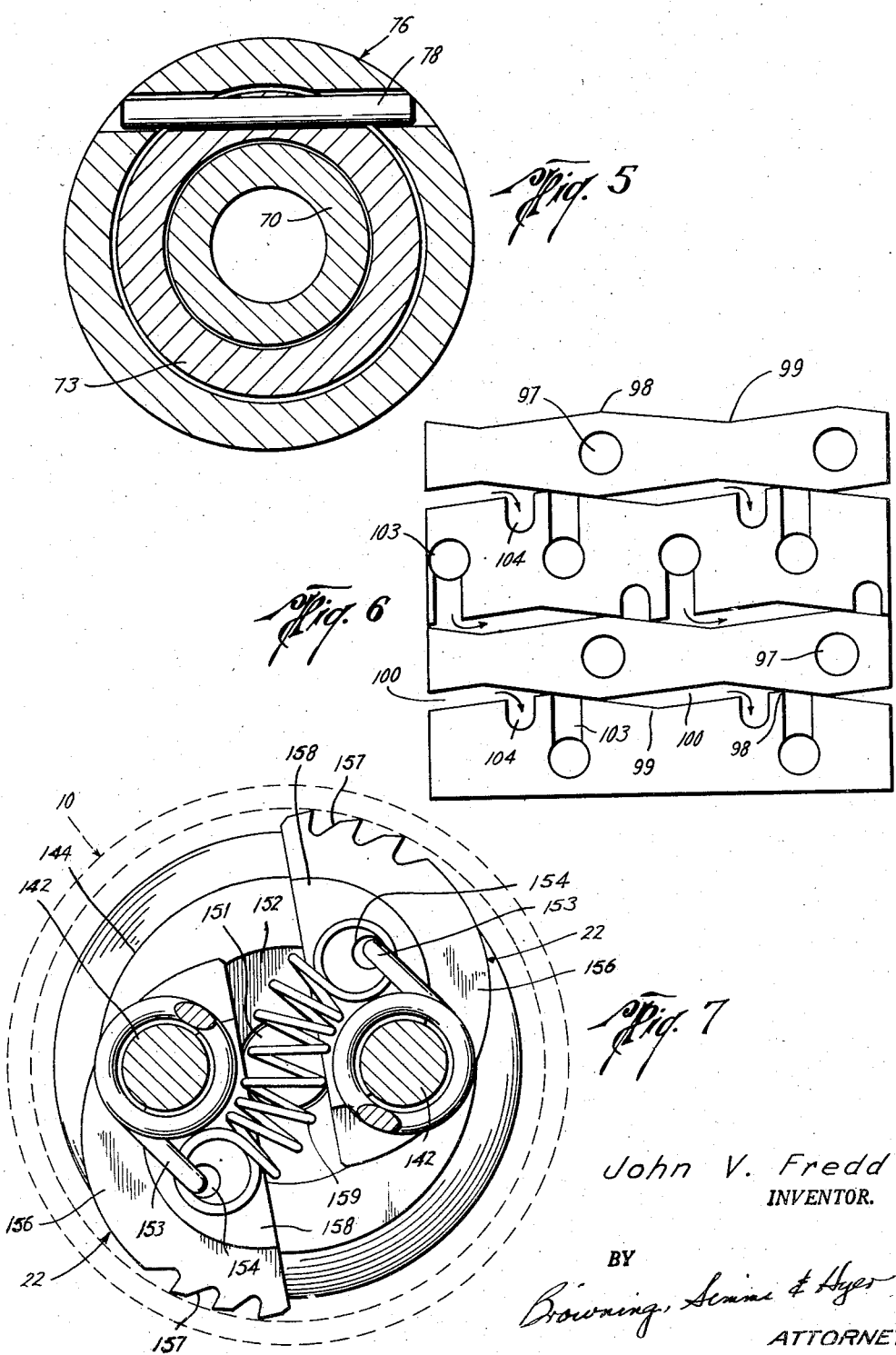
John V. Fredd
INVENTOR.
BY
Browning, Simms & Hyer
ATTORNEYS

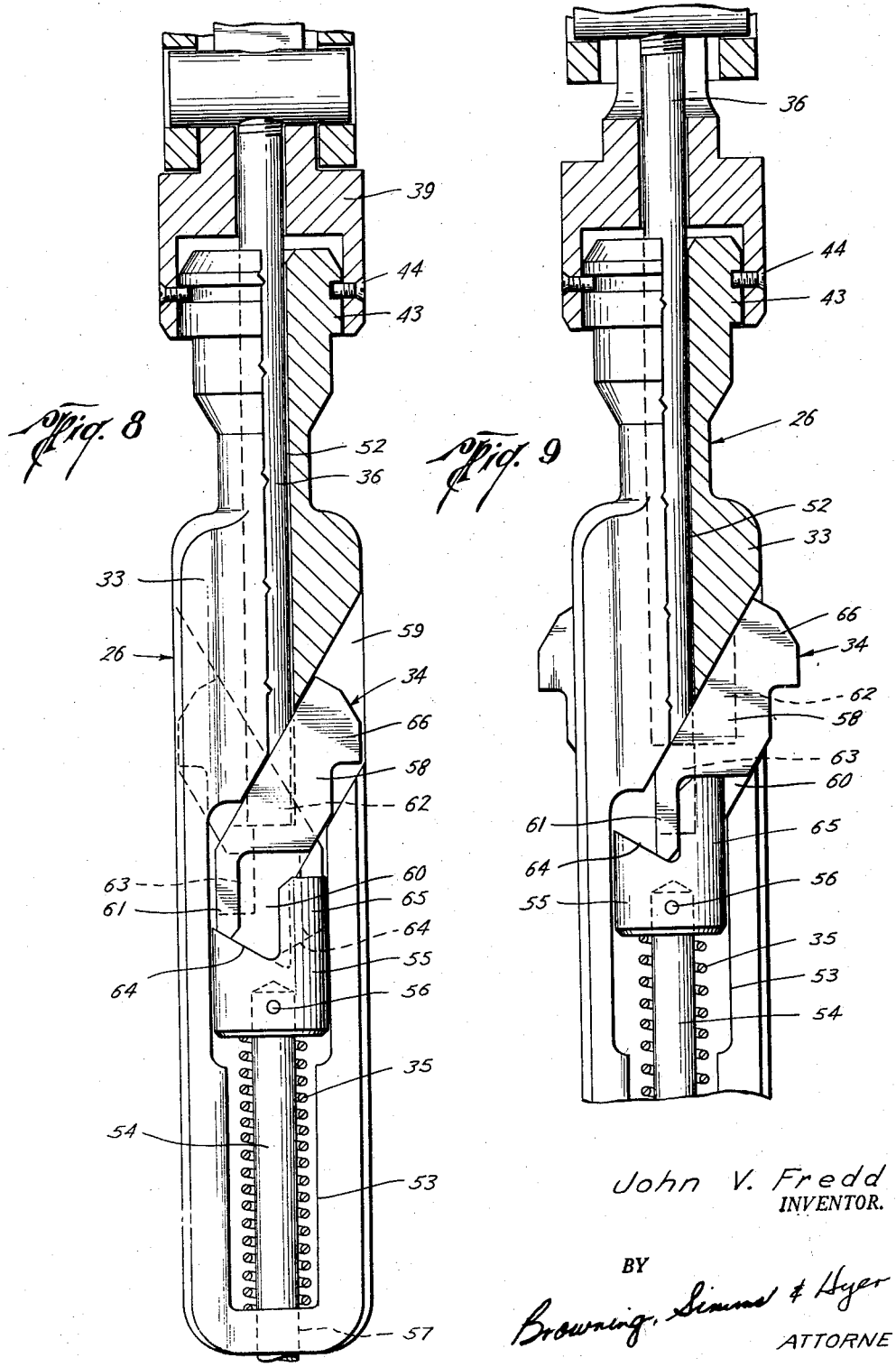

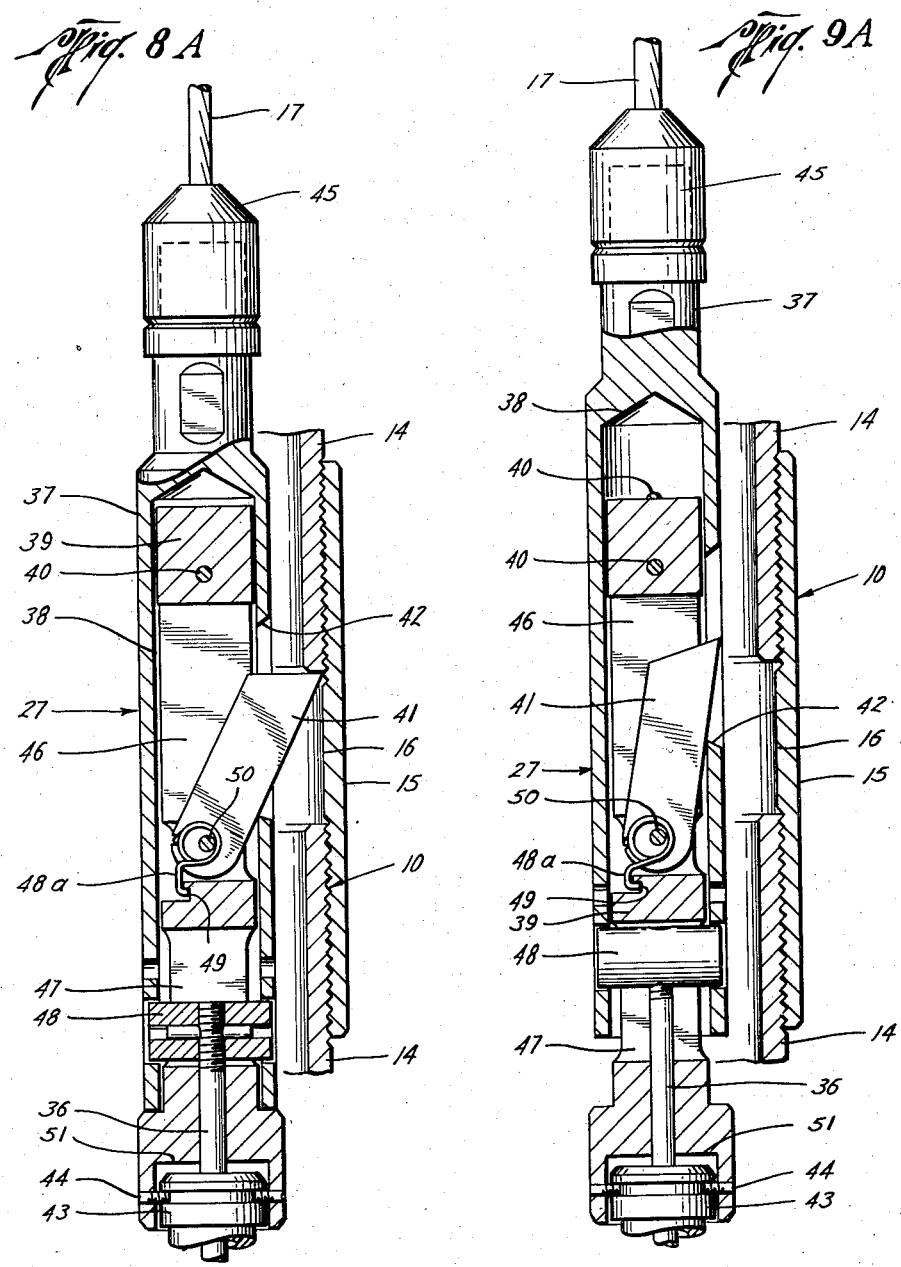

2,880,804

APPARATUS AND METHOD FOR CUTTING WELL TUBING

John V. Fredd, Dallas, Tex., assignor to Otis Engineering Corporation, Dallas, Tex., a corporation of Texas Application May 7, 1954, Serial No. 428,166

24 Claims. (Cl. 166—55.8)

This invention relates to a method and apparatus for cutting or severing well tubing while it is lodged in a well casing with a cutting tool that can be disposed within the tubing by wire line operations. In one of its aspects, this invention relates to a method and apparatus which enables the well tubing and casing annulus to be utilized as conduits for the circulation of fluid under pressure from ground level through the tool and back to ground level for the purpose of operating the same.

There are many instances in which it is desirable to cut off or sever a section of well tubing while in the casing, and usually these instances arise when the desired cut-off point is several thousand feet below ground level. One difficulty encountered in severing the tubing is in providing a tool having sufficient power to cut the tubing and yet of sufficiently small size to fit within tubing of, for example, 2 inches I.D. For this purpose, the prior art approached the problem with relatively small motors, especially designed for use in driving cutter elements within well tubing. However, this did not prove entirely satisfactory from a practical standpoint since either electrical power leads for electrical motors or fluid conduits for hydraulic motors had to be extended from ground level down to the tool, which complicated manipulation of the cutting tool within the tubing. Also, when exceedingly high pressures are present within the well, such leads or conduits between ground level and the tool itself constitute pressure responsive areas which further complicate, and sometimes make impossible, lowering of the tool to the desired depth within the tubing.

It is an object of this invention to provide a method and apparatus for cutting or severing well tubing independently of special power leads or the like leading from the intended cut-off point within the well to ground level.

Another object is to provide a cutting tool disposable within the tubing and operable upon passage of fluid through the tubing in only one longitudinal sense to sever the tubing.

Another object is to provide a method and apparatus for cutting well tubing while disposed in a well, in which the tubing and casing annulus are employed as hydraulic fluid conduits for use in driving hydraulically powered cutting elements in engagement with the tubing.

Still another object is to provide a well tubing cutting tool including motor means disposable within well tubing for driving cutting elements thereon and substantially blocking tubing flow except through the motor means, whereby sufficient fluid flow through the tubing passes through the motor to actuate the same and drive cutting elements in engagement with the tubing.

Still another object is to provide a well tubing cutting tool of the type described in the foregoing object, including means arranged peripherally on the tool for locking the same within the conduit and being provided with a flow passage therethrough communicating with the flow passage through the motor means in a manner to prevent fluid flow within the tubing from damaging the locking means parts.

Still another object is to provide hydraulic motor means adapted for disposal within a well tubing of small diameter and capable, while disposed within the well tubing, of actuating cutting elements with sufficient power to sever the well tubing.

Still another object is to provide a novel hydraulic motor especially well adapted for rotating cutting elements within a well tubing, in which hydraulic fluid for the motor passes therethrough between a point axially thereof and a point circumferentially thereof, such that the rotors of the motor may be contained within an elongate small diameter housing which may be easily run into the well tubing.

Still another object is to provide, with a well casing and a well tubing having a perforation through its wall communicating with the casing annulus, a method and apparatus for actuating cutting elements within the well tubing in which an hydraulically operated motor means is disposed within the tubing and flow restricting means sealably engages with the tubing above the perforation for directing fluid flow between the tubing and annulus through the motor means for driving the same.

Still another object is to provide a well tubing cutting tool having cutter elements releasable into and retractable from cutting engagement with the well tubing upon jarring impacts delivered to the tool.

Yet another object is to provide a tool disposable within a well conduit and having flow restricting means carried thereon in a normally inoperative position, together with a normally inoperative means for locking the tool within the conduit, and a running tool for lowering said tool and rendering both of said means operable upon jarring of the tool.

Other objects, advantages and features of this invention will be apparent to one skilled in the art upon a consideration of the written specification, the attached claims and the annexed drawings.

The over-all apparatus of the present invention, by means of which the method may be carried out, includes a tool having cutting elements connected to an hydraulic motor for driving the elements in cutting engagement with the well tubing, wherein the motor is actuated by fluid flowing through the tubing. The tool is provided with flow restricting means which directs fluid, which is flowing longitudinally through the tubing, into and through the motor without the use of special conduits or other power connections to ground level. Continuous fluid flow in one longitudinal directional sense through the tubing and motor is maintained by forced circulation of the fluid from the ground level through the tubing, casing annulus and a perforation in the tubing located near the intended point of cut-off.

The flow restricting means for this purpose preferably comprises a packer surrounding the tool and selectively sealably engageable with the tubing to prevent erosion of the periphery of the tool, the locking parts or the like, as well as to increase efficiency of the tool. Such packer is so arranged with respect to the motor of the tool that, upon expansion, a barrier is formed against fluid flow through the tubing except through the motor. Putting it another way, the barrier so formed acts to confine all fluid flow within the tubing between the inlet and outlet of the motor to passage through the motor.

Apparatus in the form of a collar stop is provided for landing the tool in a position within the tubing whereby the packer is located above the perforation so that, upon sealing engagement of the packer with the tubing, the motor of the tool is operable to drive the cutting elements merely upon fluid flow from ground level through the tubing, casing annulus and perforation. The motor so provided is designed for maximum power output in proportion to its cross-sectional area such that fluid under pressure which is passed therethrough is sufficient to drive the cutting elements of the tool to sever the well tubing.

As previously noted, special power connections for the motor between the tool and the ground level are eliminated. In fact, the only connection required between the tool and ground level is that of a wire line or other suitable means for landing and locking the tool within the tubing and releasing and removing the tool therefrom, if desired. Once the tool is suitably locked, however, even these connections may be removed and the motor operated, as described above, by the mere circulation of fluid through the tubing. As well, the means for locking the tool within the tubing are so arranged relative to the motor therefor that fluid which flows through the motor also passes through a conduit centrally of the locking means, thereby preventing damage to the tubing gripping elements on the locking means.

In accordance with still further novel aspects of the present invention, the cutting elements of the tool as well as the aforementioned landing and locking devices are especially well adapted for manipulation by wire line operation.

In the drawings, wherein like reference characters are used throughout to designate like parts:

Fig. 1A is a vertical sectional view of a tubing and casing with a conventional perforating device in position within the tubing for forming one or more perforations through the wall thereof;

Fig. 1B is a vertical sectional view of the tubing and casing with a stop set in a collar of the tubing in proper position relative to the perforations therethrough and with a running tool for the stop in the process of being withdrawn from the tubing;

Fig. 1C is a view of the tubing and casing similar to Figs. 1 and 2 showing the cutting tool of the present invention landed upon the stop with the cutting elements and packer of the tool in operating position relative to the tubing and the direction of fluid flow within the tubing being indicated by arrows;

Figs. 2A and 2B are, respectively, vertical sectional views in successive downward arrangement along the cutting tool as it is lowered into the tubing, showing the locking means and packer carried upon an upper assembly thereof in inoperative position and a running tool for so lowering the tool by wire line and rendering operative the aforesaid packing and locking means;

Fig. 3 is a cross-sectional view of the cutting tool running tool, taken substantially along the line 3—3 of Fig. 2A;

Figs. 4A, 4B, 4C and 4D are, respectively, vertical sectional views in successive downward arrangement along the entire cutting tool, when landed and locked within the tubing and with the running tool therefor removed; of the packer and locking assembly; the hydraulic motor assembly; the speed reducing assembly; and the cutter head which contains the cutter elements;

Fig. 5 is a cross-sectional view of the packer and locking assembly, taken substantially along line 5—5 of Fig. 2B, but with a shear pin shown prior to shearing;

Fig. 6 is a developed view of the rotors and stators of the hydraulic motor of Fig. 4B;

Fig. 7 is a plan view of the cutting elements in expanded position and taken substantially along line 7—7 of Fig. 4D;

Fig. 8 is a vertical sectional view of the collar stop with its dogs retracted by a prong of the collar stop running tool;

Fig. 8A is a vertical sectional view of the collar stop running tool in its position corresponding to that of Fig. 8;

Fig. 9 is a vertical sectional view of the collar stop with its dogs expanded and the prong of the collar stop running tool partially withdrawn therefrom; and Fig. 9A is a vertical sectional view of the collar stop running tool in its position corresponding to that of Fig. 9.

Turning first to a brief description of the installation of the tool in cutting position within the tubing, it can be seen from Figs. 1A to 1C that in accordance with conventional practice a well tubing 10 is disposed concentrically within and spaced from a well casing 11 within a well bore 12 to form an annulus 13 between the casing and tubing. Individual pipe joints 14 of the tubing are coupled together with collars 15 which form annular recesses 16 along the inner diameter of the tubing. It will be understood that the casing and annulus extend from ground level to substantially the bottom of the bore or hole, neither of which are shown. As well, of course, for the purposes of this invention, conventional winch mechanism may be disposed at ground level for operating a wire line 17 or the like and conventional slush pumps may also be provided for circulating fluid under pressure from ground level through the tubing, casing annulus and perforation (to be described) and back to ground level.

It is first necessary in the installation and use of the cutting tool of the present invention to perforate the tubing as at 18 for the above-mentioned purpose of establishing communication between the tubing and annulus. The location of the perforation is determined by the intended cut-off point of the tubing and, as will be more fully understood in connection with the tool itself and the landing and locking devices therefor, is near or substantially adjacent said point. Preferably, it is located below or very slightly above (as shown in Figs. 1A to 1C) the intended cut-off point to insure that the packer of the tool is disposed in operative position above the perforation.

The cutting tool, designated in its entirety by the numeral 19, is shown in Fig. 1C in landed position within the tubing. It can be seen therefrom that the expanded packer 20 of the tool is sealably engaged with the tubing above the perforation 18 such that fluid flow through the motor 21 circulates through the tubing, annulus and perforation, as indicated by the arrows of Fig. 1C. It can also be seen that although the perforation is above the intended cut-off point, the level of which is indicated by the cutting elements 22 of the tool, it is only slightly so, and if it were disposed so far above the cut-off point as to be above the packer 20, the desired circulation could not be obtained.

A conventional perforating device, as shown at 23 of Fig. 1A, may be used. As shown and as well known in the art, devices of this type may be lowered within the tubing by the wire line 17 and landed at the desired depth upon a removable stop 24 having slips 25 operable for locking engagement or disengagement with the tubing by wire line manipulation. Due to their conventional use in the industry, as well as the fact that other suitable perforating means may be employed, it is not thought necessary to describe the details of the device 23. Certain of the details are set forth on page 26 of the 1953-54 catalog for Otis Pressure Control, Inc. As shown in Fig. 1A, a series of perforations 18 may be made around the tubing.

As shown in Fig. 1B, a collar stop 26 is landed in the recess 16 of the nearest collar 15 to the desired tubing cut-off point. Thus, in the particular installation shown in the drawings, wherein the cut-off is to be nearest the lower end of the pipe joint 14, the collar stop 26 is landed in the recess of the lower collar therefor. The stop 26 is lowered within the tubing and landed in the recess 16, after removal of the perforating device 23, by a collar stop running tool 27 which is operable by means of the wire line 17, in a manner to be described hereinafter in connection with the details of both the collar stop and running tool. At any rate, it is sufficient to note at this point that after the stop 26 has been landed, as shown in Fig. 2, the collar stop running tool 27 may be removed from the tubing.

At this time, the cutting tool 19 may be lowered by a running tool 28 (see Fig. 2A) on a wire line within the tubing and landed upon the stop 26. While the cutting tool is being lowered, locking means in the form of slips 29 and the packer 20, which are carried by the locking and packer assembly 30, are both in an inoperative position out of engagement with the tubing. As well, the cutting elements 22 are in retracted position such that the entire tool may be easily lowered into the tubing without damage to any of its parts.

When the tool 19 is landed upon the stop 26, downward jars are operable to release the cutting elements from retracted position and cause the running tool 28 to cooperate with the assembly 30 in rendering operative the packer 20 and slips 29, in the order mentioned. Upon such expansion, the packer 20 sealably engages the tubing and the slips 29 bite into the tubing wall whereby they are locked thereto to counter torque developed by the hydraulic motor during the cutting operation and movement of the cutting tool as a whole within the tubing is prevented. Of course, the application of fluid pressure to the upstream side of the packer cup 20 will further insure its sealed engagement with the tubing. In its preferred form, as illustrated in the drawings, the running tool 28 is at this time removable from the cutting tool upon raising of the wire line upon which it was lowered into the tubing.

Connected to the assembly 30 in successive downward order are the hydraulic motor 21, the speed reducing assembly 31, and the cutting head including the cutting elements 22. The connection between these various parts of the tool is such that jarring impacts delivered to the uppermost portion thereof will be transmitted to means within the cutter head which permit release of the cutting elements 22 into engagement with the tubing. For this purpose, as well as for jarring the running tool 28 in the manner above-described, jars of conventional form are supported on the wire line for delivering upward or downward jars thereto, as desired. With the cutting elements thus in tubing cutting position, forced circulation of fluid may be started through the tubing, annulus and perforation and through the motor 21 for driving the same. The internal mechanism of the motor is connected with the cutting elements 22 so as to impart rotative movement to the elements upon operation of the motor. Suitable driving speed for the cutting elements is obtained by the speed reduction assembly 31 disposed between the internal mechanism and the cutting elements.

Although the apparatus of the present invention is especially well adapted for operation upon circulation of fluid downwardly through the tubing and upwardly through the annulus, as indicated in Fig. 1C, with minor modifications it is operable upon a reversed or well production circulation, i.e., downwardly through the annulus and upwardly through the tubing. Water, oil or drilling mud are the preferred fluid media.

Upon severing of the tubing by the cutting elements, as indicated in Fig. 1C, fluid circulation may be stopped and the cutting tool 19 removed from the hole by a number of techniques. For example, the cutting tool may be merely lifted out with the severed section of the tubing string. On the other hand, further jarring action may be used to retract the cutting elements 22 and render inoperative or collapse the slips 29 and packer 20, whereby the entire cutting tool may be lifted out of the tubing, all by wire line operation.

Referring now to the details of the apparatus abovementioned, the details of the collar stop 26 are shown in Figs. 8 and 9, the dogs of the stop being retracted in Fig. 8 and expanded in Fig. 9 for landing or latching in a collar recess 16, as shown in Figs. 1B and 1C. The details of the collar stop running tool 27 in Figs. 8A and 9A illustrate, respectively, the positions of the tool corresponding to the collar stop 26 in the positions shown in Figs. 8 and 9. Although this stop and running tool do not constitute novel features of this particular application, the detailed description to follow is thought justified in the interest of a complete disclosure.

The collar stop 26 includes a body 33 upon which are carried dogs 34 normally urged toward a radially outward expanded position (Fig. 9) by a spring member 35, but which may be held in retracted position by means of a depending prong 36 on the running tool 27. In the fully expanded position, the dogs 34 are adapted to latch into a collar recess 16 and thereby land the stop against downward movement in the tubing.

The collar stop running tool includes a body 37 which is internally bored from its lower end at 38 to receive a latch carrier 39. The latch carrier is shear pinned in an upper position within the bore 38 as at 40 and carries a latch 41 which is normally urged outwardly through an opening 42 in the body 37 (Fig. 8A), but which may be retracted within the opening (Fig. 9A) upon shearing of the pin 40.

In operation, the stop and tool are run as a unit into the tubing upon the wire line 17 with the latch carrier 39 pinned in its upper position and the head 43 of the collar stop carried from the lower end of the latch carrier by shear pins 44. In this position (Figs. 8 and 8A), the prong 36 holds the dogs 34 of the stop in a retracted position, in a manner to be more fully described hereinafter, while the latch 41 is yieldably urged outwardly against the tubing wall. The assembled device is lowered to a point in the tubing relative to the perforation 18 such that, when the tool is raised, latch 41 engages in the next upwardly succeeding collar recess 16. Upward jarring may then be employed to shear the pin 40 which permits the latch carrier 39 to descend in the bore 38 to retract the latch 41 from the recess 16 and release the dogs 34 for expansion into engagement with the tubing wall. Lowering of the device will now permit the dogs 34 to further expand and latch into the next downwardly succeeding collar recess 16. At this time, the collar stop 26 is landed against downward movement in the tubing and the running tool 27 may be disconnected therefrom upon shearing of the pins 44 by continued downward jarring by means of the wire line.

When the running tool 27 is so disconnected from the collar stop, the downward jarring will have caused the latch 41 to again be urged outwardly through the recess 42 such that when the tool is lifted from the tubing, said latch will temporarily engage in the next upwardly succeeding collar recess. However, continued upward movement of the wire line will force the latch carrier 39 downwardly in the bore 38 and thus retract the latch 41 and permit unimpeded removal of the running tool from the tubing.

Turning now to certain details of the above-described device, it can be seen that the wire line 17 is connected to the body 37 of the running tool by a threaded coupling 45. The latch carrier 39 fits slidably within the bore of the body and is provided with two longitudinally spaced and laterally extending recesses 46 and 47 therethrough which accommodate, respectively, the latch 41 and a holder 48 for the upper end of prong 36. The latch 41 is thus permitted to swing inwardly and outwardly of the opening 42 during operation of the tool and under normally outwardly urging of a spring 48a connecting the latch and latch carrier by means of notch 49 in the carrier and pin 50 on the latch. It can be seen from Figs. 8A and 9A that with the pin 40 sheared and latch carrier 39 lowered, the latch 41 is urged inwardly by the lower edge of the opening 42.

The lowermost position of the latch carrier is defined by landing of the upper edge of recess 47 on the prong holder 48, as shown in Fig. 9A, in which position of the carrier the latch 41 is fully retracted. The holder 48 is fixedly located across the body 37 of the running tool such that the latch carrier moves longitudinally with respect thereto. Thus, it will be understood that as the pin 40 is sheared and the latch carrier drops, the prong 36 is in effect lifted from its dog retracting position.

As shown in the drawings, the lower end of the latch carrier which is shear pinned at 44 to the head 43 of the collar stop is bored as at 51 to an extent sufficient to space the upper end of the head slightly from the carrier. In this manner, when the dogs 34 are latched into a collar recess 16, the afore-mentioned downward jars upon the assembly will move the body 37 downwardly relative to the latch carrier and collar stop body 33 until the slack therebetween is taken up and the above-mentioned space will permit shearing of the pins 44 upon continued jarring. Although this action again urges the latch 41 outwardly, as previously mentioned, it is again retracted when the running tool is lifted and the next upwardly succeeding collar recess is passed.

Turning next to the details of the collar stop 26, the body 33 thereof is flattened on opposite sides, the flat faces being in planes parallel to movement of the dogs 34. The upper portion of the body is bored longitudinally at 52 to receive the prong 36, while the lower portion is recessed at 53 laterally through its flat faces to accommodate the spring 35 which encircles a rod 54 and is compressed between the lower end of the body 33 and a plunger 55 guidably movable vertically within a portion of the recess 53. The rod 54 is secured to the plunger by a pin 56 but is slidable in an opening 57 through the lower end of the body 33 to permit the spring 35 to be compressed upon lowering of the plunger 55. Normally, however, the plunger is urged by the spring to its uppermost position (Fig. 9).

The dogs 34 are carried between the body 33 and the plunger 55 in a manner to permit them to be held in retracted position by the prong 36, as shown in Fig. 8, but to cause them to be expanded (Fig. 9) upon lifting of the prong relative to the body, in a manner previously described. More specifically, the dogs are disposed on opposite sides of the body and each is provided with an angularly extending central portion 58 having oppositely facing side surfaces adapted to slide in complementarily shaped side faces of recesses 59 in the flat faces of the body 33. The outer face of each dog is recessed at 60 to form a depending leg 61 at one side thereof, while the inner face is recessed and counter-recessed at 62 and 63, respectively, as indicated by the broken lines of Figs. 8 and 9 and for a purpose to be described.

The upper end of the plunger 55 is provided with oppositely disposed angularly extending surfaces 64 over which similarly shaped lower end faces of the dogs 34 are adapted to slide. Thus, it can be seen from Fig. 9 that with the plunger compressed to its uppermost position, each dog will be held in an expanded position by means of an upwardly extending flange 65 on the plunger which is adjacent the outer dog recess 60 and the depending leg 61. In this position, collar recess engaging fingers 66 on the dogs are in position to latch into a collar recess 16 when the assembly is operated in a manner previously described. When so latched, the collar stop 26 cannot be lowered but may be raised past the collar recess.

When the dogs 34 are forced inwardly of the body 33, the lower end of each bears against the plunger 55 to lower the same and compress the spring 35. When the dogs are forced to their fully retracted position of Fig. 8, the recess 62 of each will be aligned with the bore 52 such that the prong 36 can be extended therethrough and landed on said recesses. At this time, with the latch carrier 39 pinned at 40 to the running tool body 37 and at 44 to the head 43 of the collar stop, the prong 36 will hold the dogs retracted by its bearing position in the recesses thereof.

However, when the pin 40 is sheared such that the prong 36 is raised relative to the body 33 to the position shown in Fig. 9, the dogs 34 are released to move to their expanded position. Upon shearing of the pin 40, the collar stop assembly is normally lifted several feet above the collar recess 16. In order to move the assembly downwardly to latch the expanded dogs 34 into the recess and yet not cause the dogs to dig into the tubing wall, the downward force from the wire line tools is applied to the dogs rather than to the body 33. This is accomplished by designing the recesses 62 and 63 so that the prong 36 remains in recess 62 when the dogs are expanded against the tubing wall as well as when the dogs are retracted. Yet, when the dogs latch into the collar recess 16 so as to be fully expanded to the position of Fig. 9, the recesses 63 are moved sufficiently to permit entry of the prong 36. In this manner, during the previously described operation in which the pins 44 are sheared, the prong 36 enters the counter-recesses 63 so as not to disturb the fully expanded and latched position of the dogs.

With the collar stop 26 disposed in the collar recess 16 nearest the perforation 18 and with the running tool 27 removed from the tubing, as shown in Fig. 1C, the cutting tool 19 may be lowered into the tubing and landed upon the stop 26. As previously mentioned, the tool 28 for running the cutting tool is attached to the upper end of the locking and packer assembly 30 and the entire tool 19 lowered into the tubing by wire line. More particularly, the lower end of the running tool 28 is shear pinned to the upper end of the assembly 30 by tangential pins 67 which are received between shear pin holes 68 in the running tool and annular recess 69 in the assembly.

When the assembly is so attached to the tool 28, as shown in Figs. 2A, 2B and 3, the slips 29 and packer 20 are rendered inoperative in a retracted position such that a clearance is provided therearound in running into the tubing. However, upon landing of the cutting tool on the stop 26, a downward jar on the tool is transmitted from the body 72 of the tool 28 to the core 71 to which it is pinned and thus to an inner mandrel 70 of the assembly. This jarring shears the pin 72a (see Fig. 3) between the core and body, thereby permitting the body 72 to move downwardly relative to the core to force slip carrier 73, surrounding the mandrel 70, downwardly relative thereto and into slip expanding position.

Slot 75 in sleeve 74 and slot 79 in the body 72 permit the body and sleeve to move downwardly relative to the core 71 and mandrel 70. During this initial movement, the slip carrier 73 is forced downwardly a sufficient distance to in turn force a conically shaped expander 76 into engagement with a collar 76a on the mandrel 70 and into the packer 20 to mechanically expand the same into sealing engagement with the tubing. At this time, the slips 29 flexibly connected to the expander 76 are received within recesses 77 in the slip carrier 73 by means of shear pin 78 (see Fig. 5). In this position, of course, the slips are inoperative or out of engagement with the tubing.

Upon landing of the expander upon the collar 76a, however, the upper edge of recess 75 has not landed upon the cross pin 83 of the core 71. Thus, further downward movement of the sleeve 74 and body 72 will shear the pin 78 and permit a conical expander face 80 on the slip carrier 73 to be forced into the slips 29, urging them outwardly toward tubing engaging position. However, prior to full expansion and setting of the slips, the upper edge of recess 75 will land upon cross pin 83, whereby the downwardly jarred body 72 moves down relative to the sleeve 74. Such downward movement of the body will shear the pins 67 and then force the slip carrier 73 downwardly a distance sufficient to fully expand and set the slips (Fig. 4A). Of course, the slot 79 in the body is sufficiently long to permit this setting of the slips prior to landing of its upper edge on the cross pin 83.

It can be best seen from Fig. 1C that fluid which flows within the tubing and through the motor (as indicated by the arrows) does not flow over the periphery of the slips 29. In this manner, the possibility of abrasive action due to fluid flow over the slip teeth, for example, is eliminated. It will be appreciated that increased velocity of flow around the confined areas of the slips would otherwise present a problem.

The body 72 includes an upper portion having a threaded neck 81 for connection with a wire line tool for lowering the same and a lower portion having a central bore 82 which slidably receives the core 71. The core is provided with a cross pin 83 having oppositely disposed laterally extending portions which extend into and are guided in the slots 75 and 79 in the sleeve 74 and body 72, respectively. As well, the core is slotted longitudinally at 84, as best shown in Fig. 3, to facilitate lowering of the tool into the tubing by permitting freer fluid passage therepast.

The holes 68 and recess 69 are so located in the sleeve 74 and slip carrier 73 that, when disposed opposite one another and connected by the pin 67, as shown in Fig. 2A, the lower edges of the recesses 75 and 79 will be substantially level and substantially adjacent the cross pin 83 in the pinned position of the core 71. As well, the upper edge of mandrel 70 will abut with the lower edge of the core and the upper edge of slip carrier 73 with the lower edge of the body 72. Thus, a jar may be transmitted directly to the pin 72a to shear the same.

The slips 29 are movably connected at 85 to the upper end of the expander 76 in surrounding relation to the mandrel 70. As previously mentioned, the slips are received in recesses 77 in their inoperative or retracted position (Fig. 2B) but are expanded outwardly by expander face 80 to the position of Fig. 4A, whereby teeth or wickers 86 on the outer faces bite into the tubing wall.

The inner side of the normally retracted lip 87 on the packer 20 is shaped to substantially conform to the expander surface 88 on the expander 76. The inner edge of the packer is removably secured between a flange on the collar 76a and a coupling sleeve 89 threaded to the outer circumference of the mandrel 70 below said collar. It will be understood that with expander surface 88 wedged into the lip 87 of the packer 20, the outer periphery will engage the tubing wall. It will also be understood that the application of pressure to the upper side of the packer will assure its sealing engagement with the tubing wall.

The coupling sleeve 89 is threaded exteriorly for connection with a hollow housing or mandrel 90 of the motor 21, as shown in Figs. 4A and 4B, whereby this outer portion of the motor is fixed with respect to the assembly 30. A second hollow cylinder or shaft 91 is received concentrically within and spaced from the mandrel 90 to form an annulus 92 therebetween, and is movable longitudinally and rotatively within said mandrel. Stators 93 within the mandrel 90 and rotors 94 on the cylinder 91 are disposed within the annulus 92 and are operable, upon the passage of fluid between the bore 95 of the shaft 91 and various passages in the motor to be described, to impart rotary movement to the shaft 91 and thus drive the cutting elements 22. From the foregoing, it will be understood that fluid within the well tubing is delivered to the bore 95 through the mandrel 70 of the assembly 30 from the upstream side of the packer 20. Thus, the packer 20 with the body of the tool 19 forms a barrier within the tubing for fluid flow longitudinally through the tubing and the motor 21 except through the inlet and outlet of said motor.

The upper portion of the motor 21 is cut away in Fig. 4B and a number of the stators and rotors are laid out in development in Fig. 6 to better illustrate the details thereof. The stators 93 are held in longitudinally spaced relation along the inner diameter of the mandrel 90 by set screws 96 while each rotor is secured by pins 97 to the outer diameter of shaft 91 and between the spaced stators. Thus, during rotation and reciprocation of the shaft 91, the outer peripheries of the rotors slide over the inner diameter of the mandrel 90 and the outer diameter of the shaft slides over the inner peripheries of the stators. As shown in Fig. 4B, the rotors and stators are axially aligned with one another along the annulus 92.

As shown, there is one less rotor than stators, the confronting end faces of each rotor and stator having complementarily milled surfaces. More particularly, these faces are comprised of alternate peaks 98 and valleys 99, with the surfaces therebetween on opposite ends of the rotors being symmetrical and the surfaces on opposite ends of all but the endmost stators being parallel. Thus, it will be understood that upon axial rotation of the shaft 91 reative to the mandrel 90, cavities 100 of alternately increasing and decreasing volume are created within the annulus 92 between the afore-mentioned oppositely facing surfaces of the rotors and stators. Still further, with the rotor faces arranged for sliding movement over the stator faces, any given point on each rotor will follow a circular zig-zag path such that the shaft 91 is reciprocated as well as rotated. The lowermost stator end face is closed.

As previously mentioned, the bore 95 of the shaft 91 provides an inlet axially of the motor. From the bore, fluid may pass into the cavities 100 between the rotors and stators through any one of a series of ports 101 through the shaft. Outlet from the cavities is provided by ports 102 through the mandrel 90, such that the fluid course through the motor is from the bore 95, through the ports 101, through passages to be described in the stators and through the cavities, and outwardly of the mandrel 90 through ports 102.

With reference to Fig. 6 and assuming rotation from left to right, the passages 103 are for intake of fluid from the ports 101, while the passages 104 are for discharge into the ports 102. Thus, the ports 101 are arranged on the shaft 91 so as to be aligned with the passages 103 at a certain interval of rotor movement.

More specifically, each intake passage 103 and port 101 is arranged to communicate with the other only when the cavity with which said intake passage is communicating is increasing. Thus, valve action, in addition to that provided by the sliding movement of the adjacent rotor and stator faces, is accomplished. For this purpose, each intake passage 103 is arranged on the face of the stator over which the rotor first slides and then moves away. That is, with rotation of the rotor in the direction indicated, each intake passage is located on the back side of each peak 98 of the stators. The discharge passages 104 are situated on the front side of the peaks so as to provide a maximum valving action during the pumping cycle of each cavity.

It will be appreciated from the foregoing, when taken in connection with Fig. 1C, that the outlet from the motor 21 is from any one of the ports 102, each of which are located on the downstream side of the packer 20. When fluid is forced under pressure into the tubing, there are thus created upstream and downstream zones of high and low pressure, respectively. The high pressure fluid is introduced into the cavities of the motor during an increase in volume thereof and discharged from said cavities into a zone of lower pressure while said cavities are decreasing in volume. In this manner, motor action especially well adapted for the purposes of this invention is provided.

It will be understood also that, although the axial bore 95 has been described as the motor inlet and the peripheral ports 102 as the motor outlet, reversal of fluid flow within the tubing will likewise reverse this nomenclature. That is, as mentioned previously, fluid for operating the motor 21 may be forced under pressure down the casing annulus 13, through the perforation 18 and upwardly in the tubing. As in the case of fluid flow in the opposite direction through the tubing, the passage of all the fluid is confined through the motor from the inlet to the outlet thereof.

From Figs. 4B, 4C and 4D, it can be seen that the cutter elements 22, when released in a manner to be described for cutting engagement with the tubing, are driven for rotation by the shaft 91 of the motor 21. Thus, the lower end of the shaft 91 is provided with a splined coupling 105 for connection with a complementary coupling 106 on the upper end of the speed reduction assembly 31, which in turn is operative upon rotation to rotate at reduced speed a main shaft 107. As shown in Fig. 4C, the upper end of the main shaft 107 is provided with a splined coupling member 108 cooperative with coupling 109 on the lower end of the assembly 31. In turn, the main shaft 107 supports and rotates the cutter head, designated in its entirety by the numeral 110 and including the individual cutter elements 22.

Referring now specifically to Fig. 4C, the lower end of the mandrel 90 for the motor 21 is connected to a cylindrical housing 111 for the speed reduction assembly 31 by means of a sub 112. This assembly includes a pair of vertically arranged wobble gears 113 and 114, the uppermost gear 113 being disposed between an upper drive shaft 115 connected to the coupling 106 for rotation therewith and a middle drive shaft 116, and the lowermost gear 114 being disposed between the middle shaft 116 and a lower drive shaft 117.

The upper shaft 115 is provided with an annular shoulder 118 which rests upon the upper edge of a circular fixed gear 119 carried by the inner diameter of housing 111. Annular seal means 120 and bearing balls 121 are provided between the upper portion of the shaft 115 and the coupling 106 and sub 112. The middle shaft 116 is similarly supported on a fixed gear 122 and lower shaft 117 rests upon bearing balls of thrust bearing 123. In the above manner, the wobble gears and shafts are held in operative relation with one another within the housing 111.

Each of the wobble gears 113 and 114 includes an upstanding pin 124 which is received in a bore 125 in the lower end of the drive shaft above said gear. As shown, the pins and bores are angularly disposed with respect to the axis of the housing and assembly, such that rotation of each shaft transmits a wobble-like movement to its respective gear. Thus, gear teeth 126 on an annular flange of the lower portion of each of the gears are adapted to walk over gear teeth 127 on the fixed gears 119 and 122.

With the wobble gears 113 and 114 connected, about an axis intersecting at right angles the pivotal or wobble axis of said gears, by pins 128 with the upper ends of the middle shaft 116 and lower shaft 117, respectively, for rotating the same, it can be seen that the number of teeth 126 upon the wobble gears can be so related to those teeth 127 on the fixed gears as to cause wobble gear 113 to rotate middle shaft 116 at a predetermined reduced speed and, in turn, wobble gear 114 to rotate lower shaft 117 at a still greater reduced speed.

The main shaft 107 is supported in coupled relation with the lower drive shaft 117 of the assembly by a ball bearing assembly 129 slidably received in a chamber 130 formed between thrust bearing 123 and a bushing 131 at the lower end of the housing 111. As can be seen from Fig. 4C, the bushing 131 serves as the lower stop for the ball bearing assembly, the upper end of which is normally urged downwardly by a coil spring 132 in the chamber 130. Thus, for a purpose to be described hereinafter, the main shaft 107 is normally urged to a fully extended position below the housing 111, as shown in Figs. 4C and 4D, but may be forced upwardly against the spring 132. O-ring 133 permits sliding movement of the shaft 107 in the bushing 131 while sealing therebetween.

The cutter elements 22 are carried by the cutter head 110 in a manner to hold said elements out of engagement with the tubing wall when tool 19 is run into the tubing, but are releasable from their retracted position upon landing of the tool and downward jarring. In turn, the cutting elements are returnable to and held within their retracted position to enable the tool to be lifted from the tubing, after completion of the cutting operation, by light upward jarring of the tool.

Prior to retraction of the cutting elements, the main shaft 107 is shear pinned at 135 to a band or ring 135a which is held in place by a retainer bushing 134 of the cutter head. The retainer 134 is provided with an inner shoulder 137 spaced above an annular shoulder 138 on portion 136 of the shaft such that, upon shearing of the pin 135, shaft 107 may be raised relatively with respect to said retainer. The lowermost end of the shaft is milled to provide flat faces 139 which are received in a slot 140 of a body member 141 threadedly connected to the retainer. In this manner, rotation is transmitted to the cutter head 110 without imposing torque load on the shear pin 135.

Cutter shafts 142 are received in opposite sides of the body member 141 and are connected thereto by set screws 143. At their lower ends, the shafts 142 are threadedly connected to lower body member 144, over the lower end of which is threaded a cap 145 having a frusto conically shaped lower end for retaining a conically shaped bearing member 146. More particularly, the body 144 is provided with a chamber 147 in its lower portion which receives a plunger 148 for releasing the cutting elements 22, in a manner to be described. As is clearly shown in Fig. 4D, the bearing member 146 is adapted to actuate the plunger 148 through bearing balls 149. A coil spring 150 is interposed between the plunger and upper wall of the chamber 147 for normally urging the plunger and bearing 146 to their lowermost position. In this lowermost position, said bearing will rest upon but project from the lower end of the cap 145 and the upwardly extending stem 151 of the plunger 148 will be below the level of a counter-bored cavity 152 centrally disposed in the upper end of lower body member 144.

There are two cutting elements 22 of semi-circular shape, as best shown in Fig. 7, which are adapted in retracted position to abut one another along their flat edges and, upon release, are expandable outwardly to cutting position (Figs. 4D and 7) under the influence of torsional coil springs 153. Each of the cutting elements 22 is eccentrically mounted around its respective cutter shaft 142. The coil spring 153 for each cutting element is held at one end in an opening 154 (Fig. 7) in said element at a point offset from the shaft 142 and at its other end in a bore 155 in the lower end of the flattened portion of main shaft 107. In this manner, each cutting element is urged outwardly about a pivotal axis defined by the cutter shaft.

It can be best seen from Fig. 7 that each cutter element 22 comprises a cutting edge 156 having saw teeth 157 about its periphery. The pivotal mounting of the elements permits initial contact of the cutting edge with the tubing to be at a point near the shaft 142 and to progress outwardly along said edge and away from the shaft, so as to distribute the work to a large number of teeth.

An inner enlarged portion 158 is provided at both sides of each element 22 centrally of cutting edge 156 and is of a radius such that, when the elements are retracted and abutting, the combined mass of the enlarged portions of both elements will fit within the cavity 152. Thus, prior to and during running in of the tool 19, the bearing 146 and plunger 151 will be fully extended downwardly with respect to body member 144 to permit the cutting elements to be retracted and held in that position by forcing of the enlarged portions 158 within the cavity 152. Unless jarred, the cutting elements will remain in the cavity due to the friction they exert thereon and the axial thrust of coil springs 153.

However, it can be seen from Fig. 4D that when the plunger 151 is raised the enlarged portions of the cutter elements are released from the cavity 152 and the elements expand into engagement with the tubing. Downward jarring will be sufficient to overcome the forces tending to hold the elements retracted, as well as the spring 150, and thus raise the plunger. Of course, after releasing action, the plunger 151 will be returned by the spring 150 to its lower position and out of the cavity 152.

After the cutting operation is completed, the cutter elements may be returned to their retracted position by upward jarring of the tool 19. For this purpose, a tension coil spring 159 is disposed between and connects the torsional springs 153 to urge the cutting elements toward abutting relation with one another. When the latter springs 153 are operatively connected between the shaft 107 and the cutting elements, as shown in the drawings, the spring 159 is not sufficient to counteract their effect in expanding the cutting elements. However, upon release of the upper end of the springs 153 from the bore 155 of the shaft 107, they are rendered inoperative to permit the spring 159 to in effect retract the cutting elements.

Cylindrical spacers 160 are disposed around the shafts 142 between the lower end of body 141 and the springs 153 so that upon upward jarring of the tool 19 to shear the pin 135, the main shaft 107 will be permitted to slide upwardly against the shoulder 137, while the springs 153 are held down by the spacers. Upward movement of the shaft 107 thus releases the upper ends of the springs 153 from the bore 155, whereby the spring 159 causes the cutter elements to swing into abutting relation and the axial thrust of the springs 153 forces the enlarged portions of the elements back into the cavity 152.

In order to remove the tool 19 from the tubing, it is necessary to not only hold the cutting elements retracted, as noted above, but also to retract the slips 29 and packer 20 from engagement with the tubing. For this purpose, a conventional wire line pulling tool may be used to grasp and pull upwardly on the neck of the slip carrier 73. This upward movement of the carrier 73 relative to the mandrel 70 will first release the slips 29, permitting them to return to the recesses 77, and then permit the packer 20 to collapse by removing the expander 76.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A tool for cutting well tubing, comprising, a body adapted to be disposed within the well tubing, said body including a fluid actuated motor having rotor means responsive to fluid flow through the well tubing and the motor disposed therein, said motor also having inlet and outlet means communicable with the interior of the tubing, cutting elements engageable with the tubing and connected to the motor for driving operation in response to actuation of the rotor means, and flow restricting means on the body cooperable with the tubing to restrict fluid flow between the tubing and motor, whereby sufficient fluid flowing through the tubing passes through the motor inlet and outlet means for driving the rotor means.

2. A tool of the character defined in claim 1, including locking means carried by the body and expandable into and retractable out of locking engagement with the well tubing, said locking means being disposed between the inlet and outlet means of the motor such that fluid flow passing through the motor also passes through the locking means.

3. A tool of the character defined in claim 1, wherein the flow restricting means comprises a packer carried by the body and means are provided on the body for expanding the packer into and permitting its retraction out of sealing engagement with the tubing.

4. A tool of the character defined in claim 3, wherein the body comprises a tubular member with its passage therethrough communicating with the motor inlet means and which carries the packer in sealed relation therearound, and locking means on the tubular member and expandable into and contractible out of locking engagement with the tubing.

5. A tool for cutting well tubing, comprising, a body adapted to be disposed within the well tubing and including a fluid actuated motor having rotor means responsive to fluid flow through the well tubing and the motor disposed therein, said motor also having inlet and outlet means communicable with the interior of the tubing cutting elements engageable with the tubing and connected to the motor for driving operation in response to actuation of the rotor means, speed reducing means disposed between the motor and cutting elements and providing at least part of the connection therebetween, and flow restricting means on the body cooperable with the tubing to restrict fluid flow between the tubing and motor, whereby sufficient fluid flowing through the tubing passes through the motor inlet and outlet means for driving the rotor means.

6. A tool for use in cutting well tubing having a perforation through the wall thereof and disposed within and spaced from a well casing to form an annulus therebetween, said tool comprising, a body adapted to be lowered within the well tubing, said body including an hydraulic motor having inlet and outlet means communicable with the interior of the tubing, cutting elements engageable with said tubing and connected to the motor for rotation in response to operation of the motor, and a packer on the body and sealably engageable with the tubing to form upstream and downstream zones within the tubing communicable with one another within the tubing only through the inlet and outlet means of the motor, whereby the motor may be operated upon circulation of fluid in one directional sense within the tubing and annulus and through the perforation.

7. Apparatus for use in cutting well tubing having a perforation through the wall thereof and disposed within and spaced from a well casing to form an annulus therebetween, said apparatus comprising, a tool adapted to be lowered within the well tubing, and including an hydraulic motor, cutting elements engageable with the tubing and connected to the motor for rotation in response to operation of the motor, and a packer sealably engageable with the tubing and arranged on the tool for restricting passage of fluid longitudinally within said tubing through said motor, whereby upon sealing engagement of the packer with the tubing at a point above the perforation fluid passage may be established between the tubing and annulus through the perforation.

8. For use in severing well tubing at a predetermined point longitudinally thereof, wherein a well casing is disposed within a well bore and the well tubing to be severed is located within and spaced from the well casing to form an annulus therebetween and provided with a perforation through its wall near the severing point, apparatus which comprises a body disposable within the tubing, cutting elements rotatably carried by the body and engageable with the tubing, an hydraulically operated motor operably connected to the cutting elements for rotating the same, a packer carried by the body and sealably engageable with the tubing for restricting passage of fluid within the tubing through the motor, and means for landing and locking the body at a level longitudinally within the tubing such that the packer may be located between ground level and the perforation.

9. A fluid motor disposable within well tubing for driving cutting elements within the tubing to sever the same in the well, comprising, a first hollow cylinder, a second hollow cylinder arranged concentrically within and spaced from the first cylinder to form an annulus therebetween, one end of the second cylinder being closed and the other end being open, the cylinders being axially rotative relative to one another, a rotor on one of the cylinders and spaced stators on the other cylinder, said rotor and stators being axially aligned with one another within the annulus with the rotor disposed between the spaced stators, the confronting faces of the rotor and stators having complementarily shaped faces comprising alternate peaks and valleys and being slidable over one another to create cavities therebetween of alternately increasing and decreasing volume upon axial rotation of one of the cylinders relative to the other, means for admitting fluid under pressure to the cavities to increase the same and thereby move the rotor to rotate one of the cylinders, means providing for discharge of fluid from the cavities, and ports in one of the cylinders communicable with the fluid admitting means only when the volume of the cavities with which said means communicates is increasing, said fluid admitting means including ports in said complementarily shaped faces so arranged as to admit fluid into each cavity during an increase in its volume and to prevent such admission during a decrease in its volume, and said fluid discharge providing means including additional ports in said complementarily shaped faces so arranged as to prevent discharge of said fluid from the cavities during said increase in their volume and to provide for such discharge during said decrease in their volumes.

10. A device for use in locking a body within a well conduit, comprising, a mandrel adapted to support the body and be lowered within the well conduit, slip means carried by the mandrel for relative movement with respect thereto from a retracted position out of engagement with the conduit to an expanded position in locking engagement with the conduit, expander means carried by the mandrel and longitudinally movable relative to the mandrel and the slip means for expanding the slip means, releasable connecting means between the slip means and expander means for holding the slip means in retracted position, landing means on the mandrel for arresting downward movement of the slip means relative to the mandrel, a running tool for lowering the mandrel within the conduit, said running tool comprising two parts longitudinally movable with respect to each other, means for attaching the tool and mandrel to one another comprising connecting means between the expander means and a first of the running tool parts, and a releasable connection between the running tool parts, said last-mentioned releasable connection being located in a position to cause the mandrel and the second of said running tool parts to abut against one another prior to releasing of the releasable connection between the running tool parts, whereby, upon downward jarring of the running tool, the connection between the running tool parts is released to permit lowering of the first tool part and the expander means relative to the landable slip means, so that, upon landing of the slip means, the connection between the expander means and slip means will be released to permit movement of the expander means into slip means expanding position.

11. A device of the character defined in claim 10, in which the connecting means between the expander means and the first running tool part is releasable, and in which said first running tool part comprises two sub-parts relatively movable with respect to one another for releasing the connecting means with the expander means upon jarring of the tool.

12. A device of the character defined in claim 10, including a packer carried about the mandrel for relative movement with respect thereto between a collapsed position out of engagement with the conduit and an expanded position sealably engaged with the conduit, and packer expander means on the slip means operable upon landing of the slip means relative to the mandrel to expand the packer.

13. A method of severing well tubing while disposed within a well casing to form an annulus therebetween, comprising the steps of perforating the tubing near the intended point of severance, providing a tool having cutting elements and hydraulic motor means for driving the cutting elements in engagement about the inside surface of the tubing, lowering the tool within the tubing to dispose the cutting elements thereof at the intended point of severance and the inlet and outlet of the motor means in communication with the interior of the tubing, and severing the tubing by circulating fluid under pressure between ground level and the perforation through the tubing and annulus, and restricting the circulation of the fluid through the tubing to cause it to flow through the motor means from the inlet to the outlet thereof in sufficient quantity to drive the cutting elements.

14. A method of the character defined in claim 13, including the additional step of establishing a fluid tight seal between the motor means and tubing above the perforation and intermediate the inlet and outlet of the motor means to restrict the circulation of the fluid through the tubing.

15. A method of severing well tubing while disposed within a well casing to form an annulus therebetween, comprising the steps of perforating the tubing near the intended point of severance, providing a tool having cutting elements and hydraulic motor means for driving the cutting elements in engagement about the inside surface of the tubing, lowering the tool by wire line to a landed position within the tubing to dispose the cutting elements thereof at the intended point of severance and the inlet and outlet of the motor means in communication with the interior of the tubing, establishing a course within the tubing which restricts fluid flow between ground level and the perforation and through the tubing to passage through the landed motor means from the inlet to the outlet thereof, locking the tool in its landed position within the tubing, and severing the tubing by circulating fluid under pressure between ground level and the perforation through the tubing and annulus for actuating the motor means upon passage therethrough.

16. A method of severing well tubing while disposed within a well casing to form an annulus therebetween, comprising the steps of perforating the tubing near the intended point of severance, providing a tool having selectively retractable and releasable cutting elements and hydraulic motor means for driving the cutting elements, when released, in engagement about the inside surface of the tubing, lowering the tool within the tubing with the cutting elements thereof retracted to dispose the cutting elements thereof at the intended point of severance and the inlet and outlet of the motor means in communication with the interior of the tubing, establishing a course within the tubing which restricts fluid flow between ground level and the perforation and through the tubing to passage through the landed motor means from the inlet to the outlet thereof, releasing the retracted cutting elements, locking the tool in its landed position within the tubing, and severing the tubing by circulating fluid under pressure between ground level and the perforation through the tubing and annulus for actuating the motor means upon passage therethrough.

17. A method of the character defined in claim 16, including the steps of locating a landing device against downward movement within the tubing in a position to land the tool lowered within the tubing with the cutting elements thereof at the intended point of severance, and jarring the tool to release the cutting elements and lock the tool in its landed position.

18. A method of the character defined in claim 17, including the additional steps of further jarring the tool to retract the cutting elements and unlock the tool upon severance of the tubing, and then raising the tool from the severed tubing.

19. A tool for cutting well tubing, comprising a body adapted to be disposed within the well tubing, cutting elements normally carried by the body in a retracted position with respect to the tubing, resilient means connected between the body and cutting elements for urging said elements toward engagement with the tubing, and means for releasing said elements from their retracted position to permit them to be urged by said resilient means into engagement with the tubing, said body including a motor having a driving connection with the cutting elements for rotating said elements in response to actuation of the motor.

20. A tool of the character defined in claim 19, including means for rendering said resilient urging means inoperable, and means operable upon such rendering to urge said cutting elements from released to retracted position.

21. A tool of the character defined in claim 19, wherein said body includes a part for holding the cutting elements in their normally retracted position, and said releasing means comprises a part movable vertically with respect to said body part.

22. A tool for cutting well tubing, comprising a body including a fluid actuated motor adapted to be lowered into the well tubing on a wire line, cutting elements connected to the motor for driving operation in response to actuation thereof, means resiliently urging said cutting means toward engagement with the tubing, means for holding said cutting elements in retracted position, and means operable in response to jarring of the body for releasing said cutting elements into engagement with the tubing.

23. A tool of the character defined in claim 22, including means operable in response to further jarring of the body for retracting said cutting elements into their held position.

24. A fluid motor disposable within well tubing for driving cutting elements within the tubing to sever the same in the well, comprising a first hollow cylinder, a second hollow cylinder arranged concentrically within and spaced from the first cylinder to form an annulus therebetween, one end of the second cylinder being closed and the other end being open, the cylinders being axially rotatable relative to one another, a rotor on one of the cylinders and spaced stators on the other cylinder, said rotor and stators being axially aligned with one another within the annulus with the rotor disposed between the spaced stators, the confronting faces of the rotor and stators having complementarily shaped faces comprising alternate peaks and valleys which create cavities of alternately increasing and decreasing volume upon axial rotation of one of the cylinders relative to the other, slide valve means formed between said rotor and stators for admitting fluid under pressure to each cavity during an increase in its volume and preventing such admission during a decrease in its volume, additional slide valve means between said rotor and stators for discharging said fluid from said cavities during said decrease in their volume and preventing such discharge during said increase in their volume, and further valve means between one of said cylinders and one of said rotor and stators for admitting said fluid to said first mentioned slide valve means only during admission of fluid by said first mentioned slide valve means into said cavities.

References Cited in the file of this patent

UNITED STATES PATENTS

| Number | Name | Date |
|---|---|---|
| 659,675 | Jaeger | Oct. 16, 1900 |
| 1,114,132 | Gehrandt | Oct. 20, 1914 |
| 1,539,288 | Cameron et al. | May 26, 1925 |
| 1,912,634 | Gray | June 6, 1933 |
| 1,959,284 | Clark et al. | May 15, 1934 |
| 2,117,050 | Wilson | May 10, 1938 |
| 2,117,594 | Barrett | May 17, 1938 |
| 2,304,330 | Bannister | Dec. 8, 1942 |
| 2,339,171 | Jestico | Jan. 11, 1944 |